March 22, 1949.  F. W. HOFFMEYER  2,464,864
HEAVY-DUTY TRACTOR CLEVIS
Filed May 9, 1947
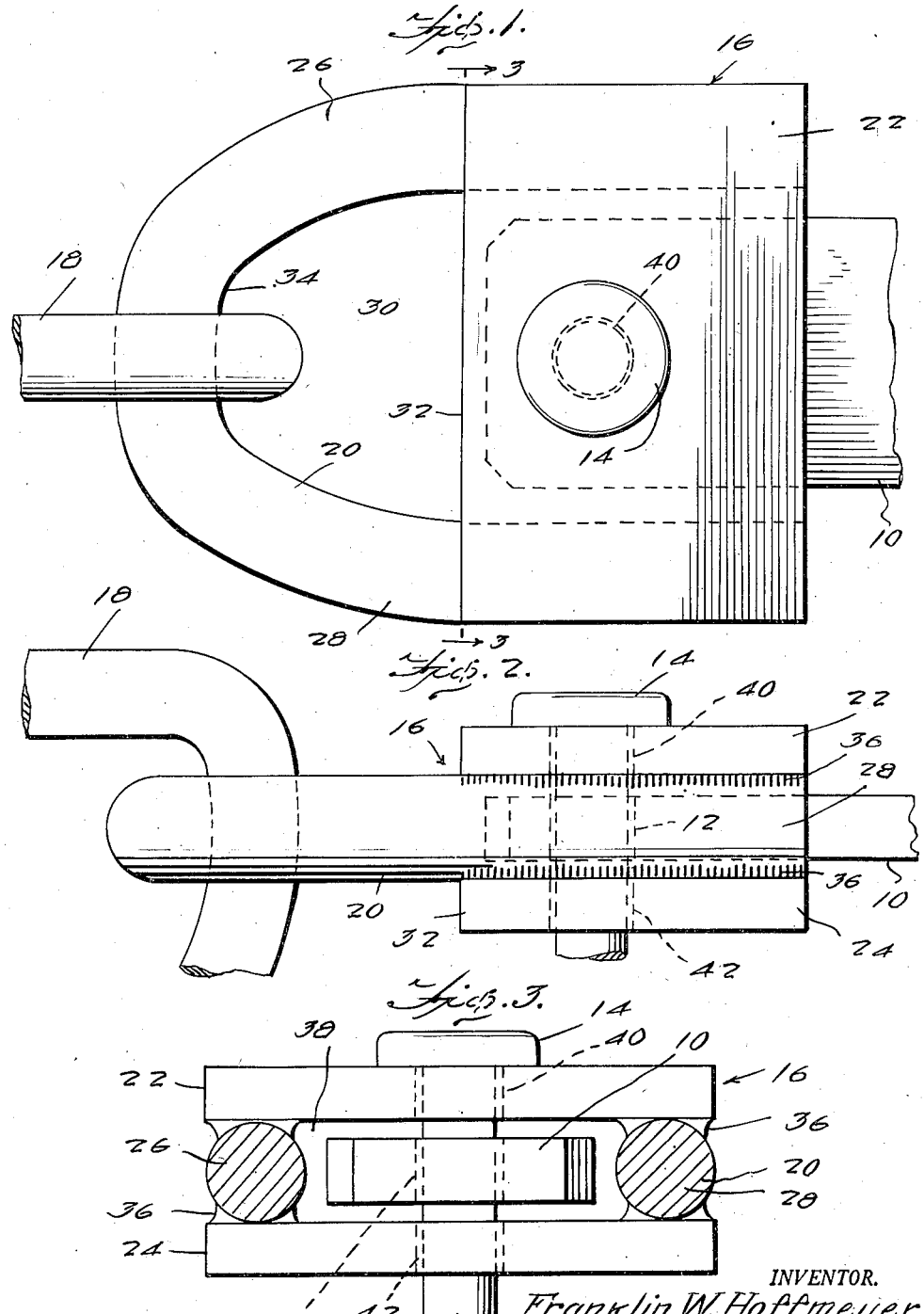

Patented Mar. 22, 1949

2,464,864

UNITED STATES PATENT OFFICE 2,464,864

HEAVY-DUTY TRACTOR CLEVIS

Franklin W. Hoffmeyer, River Falls, Wis.

Application May 9, 1947, Serial No. 747,103

1 Claim. (Cl. 280—33.44)

This invention relates to an improved clevis for use with tractors and the like.

An object of the invention is to provide a clevis for use on all types of tractors having a swinging type of drawbar, and with all machinery using various kinds of safety spring hitches or other similar hitches.

Another object of the invention is to provide a clevis for use with chains in work such as pulling stumps, rocks and other heavy objects where there would be no solid hitch to the tractor.

A further object of the invention is to provide a clevis which is so constructed as to make it impossible for it to swing around to one side of the tractor drawbar when backing away from an obstruction such as might be struck by a plow, thus avoiding breakage of the clevis.

Still another object of the invention is to provide a clevis which is simple in design, inexpensive to manufacture, and sturdy and effective in use.

Other objects and advantages of the invention will become apparent from the following description of a preferred embodiment thereof as illustrated in the accompanying drawings, and in which:

Figure 1 is a top plan view of my improved clevis, showing it in engagement with a tractor drawbar and a plow hitch.

Figure 2 is an elevational view of the device shown in Figure 1, and

Figure 3 is a sectional elevation taken on line 3—3 of Figure 1.

In the use of tractors, for drawing plows and the like, it has been of considerable disadvantage to employ the ordinary twist clevis or other types which have a tendency to swing to one side and to break when a little pressure is brought to bear against them in this way. The present invention describes a device which will not break since it is impossible for it to swing around to one side of the drawbar when backing away from an obstruction struck by the plow being drawn.

In order to understand clearly the nature of the invention and the best means for carrying it out, reference may now be had to the drawings, in which like numerals denote similar parts throughout the several views. As shown, there is a drawbar 10 the forward end of which, not shown, is secured to a tractor in any manner well known to those skilled in the art. The drawbar is provided with a vertical aperture 12 for the reception of the shank of a draw pin 14.

The clevis indicated generally at 16, is to serve as a connecting link between the tractor drawbar 10, and an element of the object to be drawn, such as the plow hitch 18. For this purpose, I provide a U-shaped element 20, which may be formed of a length of steel shafting bent into the desired shape. Heavy upper and lower lateral plates 22 and 24 formed of steel, are so placed as to overlie and underlie respectively, the legs 26 and 28 of the element 20, the plates being sufficiently narrow, as seen in Figure 1, to cover only a portion of the length of the legs, so as to leave an opening 30 between the edges 32 of the plates and the neck 34 of the element 20.

The opening 30 is thus adapted to receive the plow hitch 18, which thus hooks over the neck 34. Each plate 22 and 24, is welded securely to the abutting legs 26 and 28 of the element 20, as at 36, to form an integral assembly of great strength. As shown best in Figure 3, the thickness of the legs 26 and 28, and hence the spacing between the upper and lower plates 22 and 24, is such as to form an opening 38 for the reception of the tractor drawbar 10.

Axially aligned vertical apertures 40 and 42 are formed in the upper and lower lateral connecting plates 22 and 24, to receive the shank of the draw pin 14 which is also inserted through the aperture 12 in the drawbar, thus interlinking the drawbar and the clevis. From Figures 1 and 3, it will be seen that the opening 38 in the clevis is only slightly wider than the drawbar 10, so that while some side play exists, there is not enough to permit the clevis to turn more than a small angle about the pin 14 with respect to the drawbar. This is of especial importance, particularly when the tractor is being used to pull a plow and is required to back up to disengage the plow from an obstruction. It will be seen that during the backing-up process, there will be no undue stress on the clevis which would exist should it be free to swing around to one side of the drawbar, and that hence it will not break.

The device shown may also be used for moving rock, and for pulling stumps and fence posts with a heavy chain which cannot be hooked directly to the drawbar, the chain being extended through the loop aperture 39 in the clevis.

Although I have described a preferred embodiment of my invention in specific terms, it is to be understood that various changes may be made in size, shape, materials and arrangement without departing from the spirit and scope of the invention as claimed.

I claim:

A clevis adapted to serve as a connecting link between a load having a hitch hook and a tractor having a drawbar with a vertical aperture and adapted to provide limited angular movement of the clevis to either side of the draw bar, comprising a substantially U-shaped loop member formed of a length of heavy steel shafting and having a pair of legs interconnected by a neck, a pair of heavy plates formed of steel and respectively overlying and underlying said U-shaped member and welded to said legs thereof to form an integral unitary structure of great strength, said plates forming an opening therebetween for the reception of said drawbar and having coaxial apertures respectively formed therein in alignment with said vertical aperture in the drawbar, a draw-pin having a shank extending through said vertical aperture in the drawbar and said coaxial apertures in the plates thereby to pivotally secure the clevis to the drawbar for angular movement with respect thereto in a horizontal plane, said plates being spaced sufficiently from said neck to form therebetween a second opening for receiving said hitch hook, and said legs being spaced apart sufficiently to receive the drawbar therebetween while substantially limiting said angular movement to a small amount of side play between the clevis and drawbar whereby the clevis is free to turn only a small angle about said draw-pin and damage thereto is avoided when the tractor backs up.

FRANKLIN W. HOFFMEYER.

REFERENCES CITED

The following references are of record in the file of this patent:

UNITED STATES PATENTS

| Number | Name | Date |
| --- | --- | --- |
| 1,655,351 | Altgelt | Jan. 3, 1928 |
| 1,875,969 | Weiss | Sept. 6, 1932 |
| 1,914,963 | Stephens | June 20, 1933 |
| 2,352,397 | Mark | June 27, 1944 |